(12) United States Patent
Vengruskas

(10) Patent No.: US 12,679,594 B2
(45) Date of Patent: Jul. 14, 2026

(54) PREVENTION OF INTERLOCKING OF NESTABLE CONTAINERS

(71) Applicant: Kaylee Vengruskas, Tolland, CT (US)

(72) Inventor: Kaylee Vengruskas, Tolland, CT (US)

( * ) Notice: Subject to any disclaimer, the term of this patent is extended or adjusted under 35 U.S.C. 154(b) by 118 days.

(21) Appl. No.: 18/660,933

(22) Filed: May 10, 2024

(65) Prior Publication Data

US 2025/0346398 A1 Nov. 13, 2025

(51) Int. Cl.
B65D 21/02 (2006.01)
B29C 65/02 (2006.01)
B29C 65/48 (2006.01)

(52) U.S. Cl.
CPC .......... B65D 21/0233 (2013.01); B29C 65/02 (2013.01); B29C 65/4835 (2013.01); B29C 65/4845 (2013.01)

(58) Field of Classification Search
None
See application file for complete search history.

(56) References Cited

U.S. PATENT DOCUMENTS

| | | | |
|---|---|---|---|
| 4,181,226 A | 1/1980 | Weinert | |
| 5,105,947 A | 4/1992 | Wise | |
| 5,292,024 A | 3/1994 | Koefelda et al. | |
| 6,708,824 B2 | 3/2004 | Sahm, III | |
| 7,543,705 B2 | 6/2009 | Yourist | |
| 7,938,286 B2 | 5/2011 | Vogel et al. | |
| 9,932,146 B1 | 4/2018 | Katz | |
| 10,661,950 B2 | 5/2020 | Hutchinson | |
| 11,247,812 B2 | 2/2022 | McMurphy | |
| 2008/0105584 A1 | 5/2008 | Ceeil | |
| 2016/0304247 A1* | 10/2016 | Lewison, Jr. ............ | A47C 4/02 |
| 2018/0134448 A1* | 5/2018 | Andreasen ......... | B65D 21/0233 |
| 2020/0108976 A1 | 4/2020 | Joseph | |
| 2021/0047079 A1 | 2/2021 | Ramsey | |
| 2022/0204223 A1 | 6/2022 | Omdal Karlsen | |
| 2022/0250795 A1 | 8/2022 | Katz et al. | |

FOREIGN PATENT DOCUMENTS

| | | |
|---|---|---|
| EP | 0536613 B1 | 3/1996 |
| JP | 5903185 B1 | 4/2016 |

OTHER PUBLICATIONS

Miller Manufacturing DuraFlex Flat Back Plastic Bucket. Miller Manufacturing, 2019 Product Catalog. Dec. 18, 2018 [retrieved on Sep. 9, 2024]. Retrieved from the Internet: <URL: https://miller-mfg.com/products/flat-back-plastic-bucket>.

* cited by examiner

*Primary Examiner* — Barbara J Musser
(74) *Attorney, Agent, or Firm* — Dinsmore & Shohl LLP

(57) ABSTRACT

Embodiments of the present disclosure are generally directed to devices and methods for preventing interlocking of nestable containers. For example, interlocking of nestable containers is reduced or prevented through a spacerthermo-formed from a thermally sensitive material and coupled to sidewalls of containers. When a first container is inserted or nested within a second container, the spacercontacts a top surface of a sidewall of the second container, thereby allowing airflow between the first container and the second container and preventing the first container and the second container from interlocking.

20 Claims, 6 Drawing Sheets

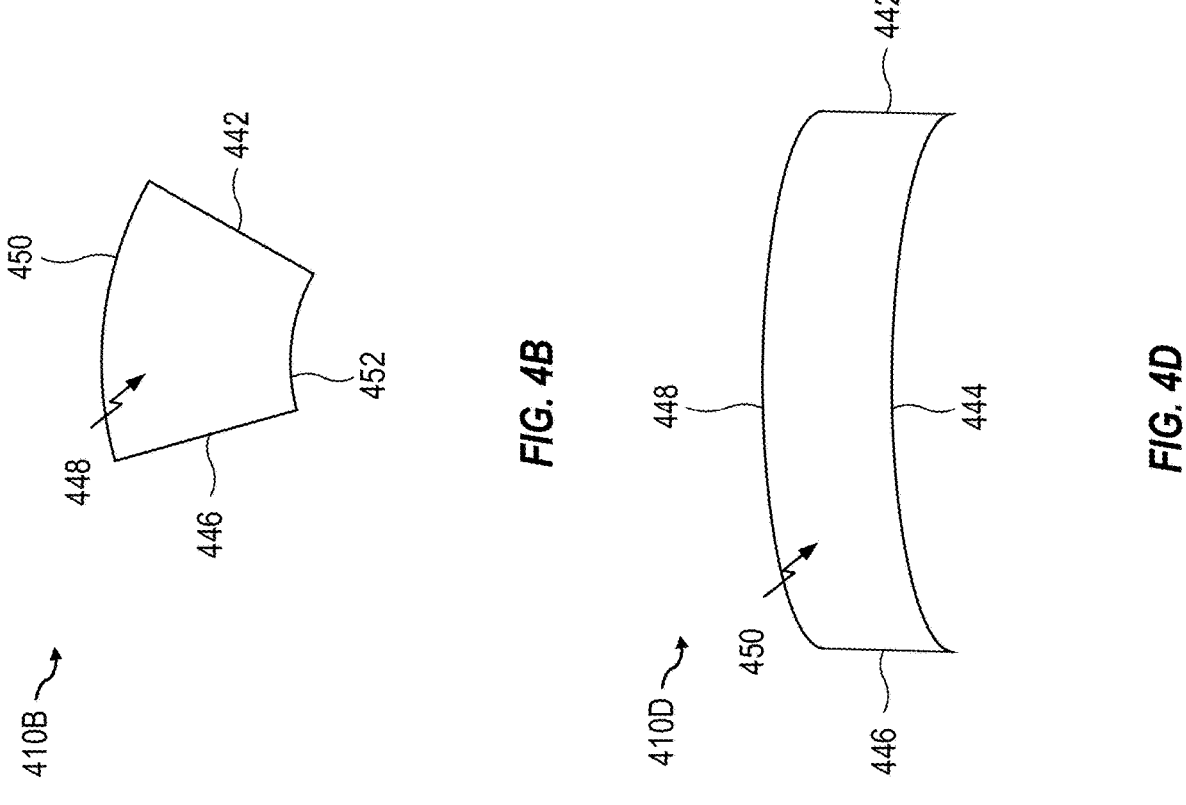
FIG. 4A
FIG. 4B
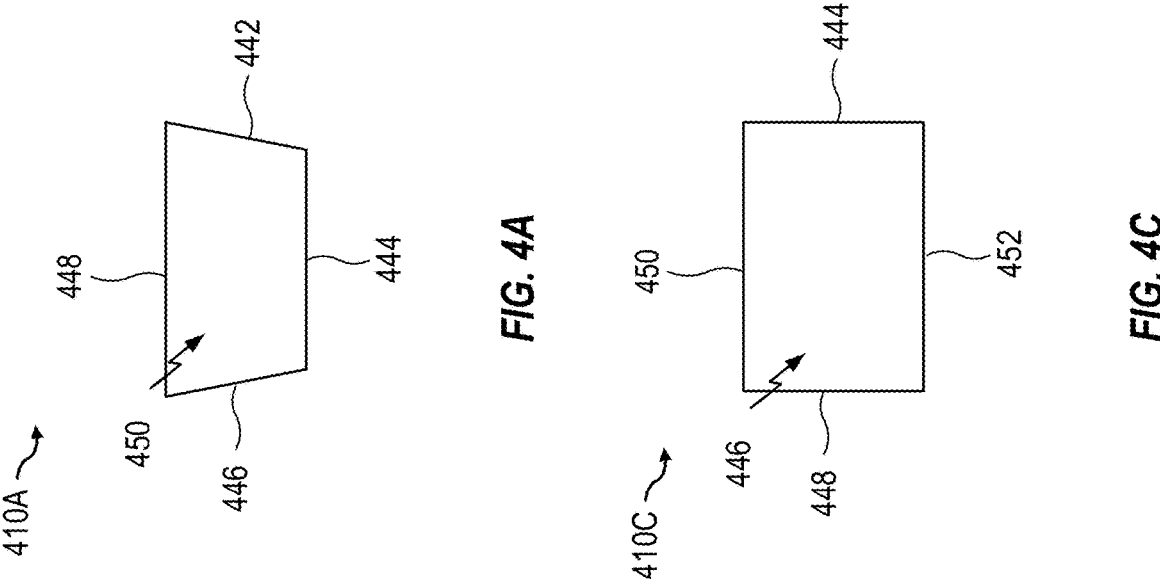
FIG. 4C
FIG. 4D

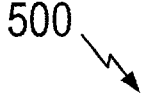

500

PREVENTING INTERLOCKING OF NESTABLE CONTAINERS

Providing a first container having a sidewall and a base, wherein the sidewall extends substantially upward from the base to define an interior volume
502

Thermoforming a spacer device from a pliable material, wherein thermoforming comprises: heating the pliable material to reach a pliable state; conforming the heated pliable material to form the spacer device, wherein the spacer device is shaped to match a contour of an exterior surface of the sidewall; and cooling the spacer device to solidify the shape;
504

Coupling the spacer device to the exterior surface of the sidewall, such that when the first container is inserted into an interior volume of a second container, the spacer device contacts a top surface of a sidewall of the second container, thereby allowing airflow between the first container and second container and preventing the containers from interlocking
506

*FIG. 5*

PREVENTION OF INTERLOCKING OF NESTABLE CONTAINERS

TECHNICAL FIELD

Aspects of the present disclosure relate to nestable containers, spacers, and methods for preventing or reducing interlocking of nestable containers.

BACKGROUND

Nestable containers are ubiquitous. Buckets, storage totes, cups, food containers, and the like may nest within one another, that is, one container may rest inside another container. Such containers may be used to store and hold a variety of materials and objects, for example, water, cement, mud, food, tools, clothing, and more.

By nesting, such containers may be readily stored in a smaller space. Transportation of nested containers may also be improved when multiple containers are nested. However, sometimes nested containers may interlock or otherwise become stuck together and difficult to separate. As one container is nested in a second, air in the second container may be evacuated, creating a suction force on the first container. This suction force may result in containers becoming interlocked.

Further, additional factors may affect the interlocking of the nested containers. For example, types of materials previously stored in the container may affect subsequent nesting. Further, environmental conditions may affect subsequent nesting, for example, temperature or temperature cycles may increase interlocking of nested containers. Furthermore, characteristics or condition of the nested containers may affect nesting. For example, different types of containers may be more susceptible to interlocking, and different materials, shapes, and the like may also affect interlocking. Containers in poor condition, for example, cracked, strained, or misshapen containers, may also be at increased susceptibility to interlocking.

Interlocked containers may be difficult to separate. Users may need to apply increased force to separate interlocked containers or use hot water to reduce the suctioning force interlocking the containers. However, in some instances, increasing the force applied to the interlocked containers may force additional air from the second container, tightening the suction force. Users may also rely on other tools to separate interlocked containers, for example, by wedging screwdrivers between containers, prying containers with pliers, or otherwise using tools in unintended and potentially hazardous manners. Sometimes material, such as rope, may be wedged between containers when nesting to prevent interlocking, however, containers may also be prevented from properly nesting and increase a risk of falling containers.

Accordingly, a need exists for improved devices and methods for reducing and preventing interlocking of nestable containers.

SUMMARY

Embodiments of the present disclosure are directed to a method of preventing interlocking of nestable containers, the method comprising: providing a first container having a sidewall and a base, wherein the sidewall extends substantially upward from the base to define an interior volume; thermoforming a spacer from a pliable material, wherein thermoforming comprises: heating the pliable material to reach a pliable state; conforming the heated pliable material to form the spacer, wherein the spacer is shaped to match a contour of an exterior surface of the sidewall; and cooling the spacer to solidify the shape; and coupling the spacer to the exterior surface of the sidewall, such that when the first container is inserted into an interior volume of a second container, the spacer contacts a top surface of a sidewall of the second container, thereby allowing airflow between the first container and second container and preventing the first container and the second container from interlocking.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIGS. 4A-4D schematically depict a spacer: in FIG. 4A the spacer is schematically depicted from a side view; in FIG. 4B the spacer is schematically depicted from a top view; in FIG. 4C the spacer is schematically depicted from a first side view; and in FIG. 4D the spacer is schematically depicted from a second side view, according to one or more embodiments shown and described herein;

FIG. 5 depicts an example of a method of preventing interlocking of nestable containers, according to one or more embodiments shown and described herein.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Embodiments of the present disclosure are generally directed to devices and methods for preventing interlocking of nestable containers. In particular, interlocking of nestable containers is reduced or prevented through a spacer thermoformed from pliable material and coupled to sidewalls of containers. When a first container is inserted or nested within a second container, the spacer contacts a top surface of a sidewall of the second container, thereby allowing airflow between the first container and the second container and preventing the first container and the second container from interlocking.

As described herein, nestable containers may become interlocked when air is evacuated from the second container when the first container is inserted and a suction force draws the first and second containers together. Embodiments of the present disclosure provide for spacers configured to facilitate airflow between the two containers and ease separation of the two nested containers. Increasing ease of separation through reducing or preventing interlocking provides for improved utility of nestable containers. For example, reducing interlocking also reduces strain and force required to separate nestable containers. Users do not need to utilize various hazardous tools or methods for separating interlocked containers. Further, containers may readily be reused after nesting.

Figure 1:
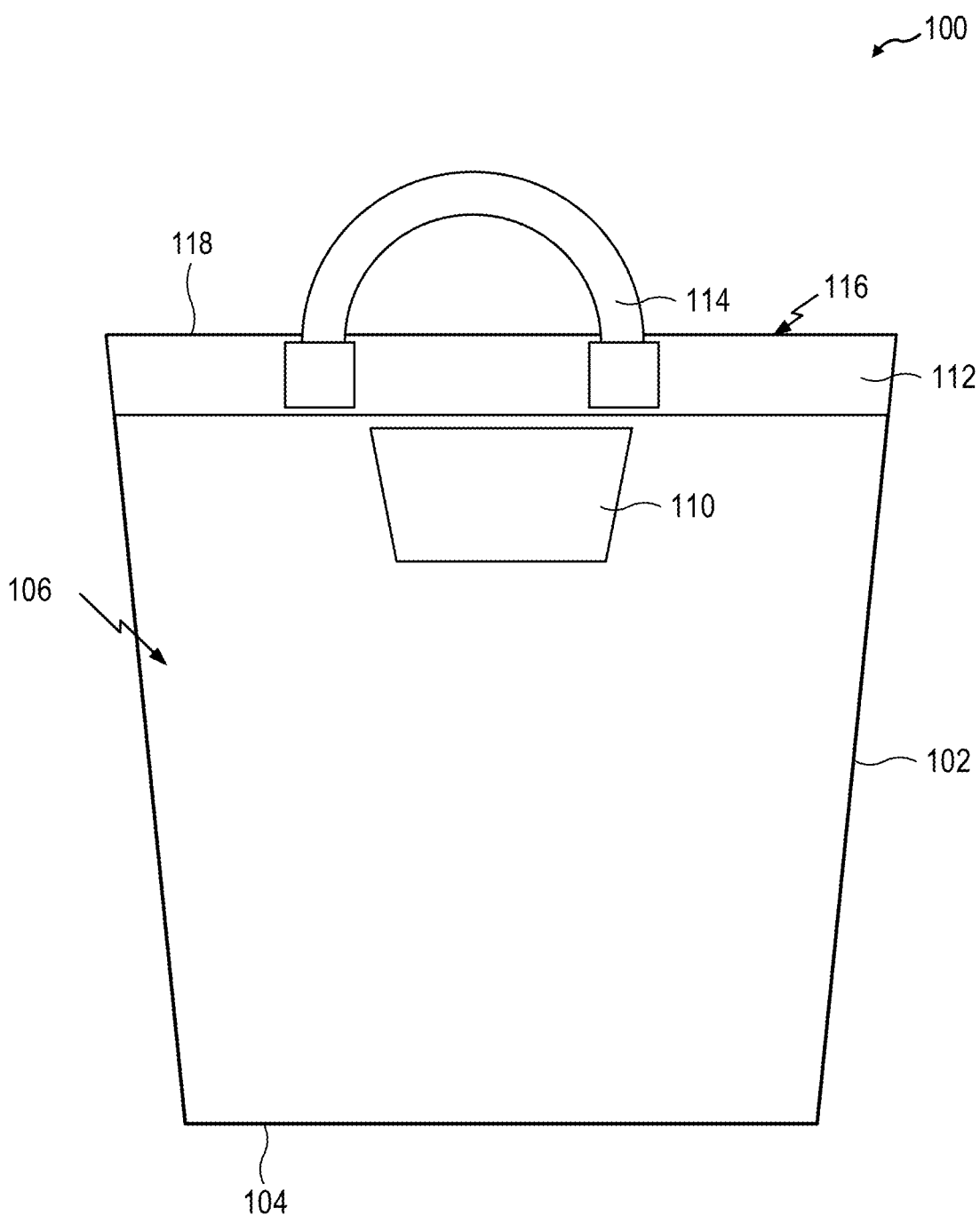
FIG. 1 schematically depicts a cross-sectional view of a first container, according to one or more embodiments shown and described herein.

FIG. 1 schematically depicts a cross-sectional view of a first container 100. A first container may be a nestable container, whereby the first container may be nested or stacked into a second container, thereby forming a nest of container. A third container may further be stacked within the first container. As used herein, a "nest of containers" includes a plurality of containers nested together. In some embodiments, the first container 100 may be a bucket, for example, a 5-gallon bucket. In some embodiments, the first container 100 may be a cup. In some embodiments, the first container 100 may be a food container, such as a storage container or bowl. In some embodiments, the first container 100 may be a cooking apparatus, for example a pot. Additional exemplary first containers include toys, pipes, tools, etc.

The first container 100 may have a base 104. In some embodiments, the base 104 is connected to or formed with a sidewall 102. Optionally, the sidewall 102 extends substantially upward from the base 104. In some embodiments, the base 104 may be generally circular and the sidewall 102 extends circumferentially along an exterior edge of the base 104. Other shapes of the base 104 are contemplated and possible (e.g., rectangular, oval, or any polygonal or non-polygonal, regular, or irregular shape). For example, in some embodiments, the base 104 may be generally rectangular and the sidewall 102 extends along a perimeter of the exterior edge of the base 104. In some embodiments, the sidewall 102 and the base 104 may be molded together during formation, for example, through injection molding. In some embodiments, the sidewall 102 may be formed out of the base 104. In some embodiments, the sidewall 102 may be coupled to the base 104.

In some embodiments, the sidewall 102 extends substantially upward from the base 104 and terminates at an edge 116, which defines an opening 118. The sidewall 102 may taper outward from base 104 to the edge 116. In some embodiments, the edge 116 may form a lip 112, for example, the lip may extend away from the sidewall 102. In some embodiments, a plurality of lips may be formed on the sidewall 102. For example, one or more of the plurality of lips may extend from the sidewall 102 at the terminal end of the sidewall 102 forming edge 116. An interior volume 106 is defined by the base 104 and the sidewall 102 and terminates at the opening 118. The interior volume 106 is accessed through opening 118. In some embodiments, the interior volume 106 is adapted to hold one or material, for example, rock, sand, soil, water, tools, etc. In some embodiments, a lid (not depicted) may be fitted to substantially enclose interior volume 106, for example, by covering the opening 118.

Figure 2A:
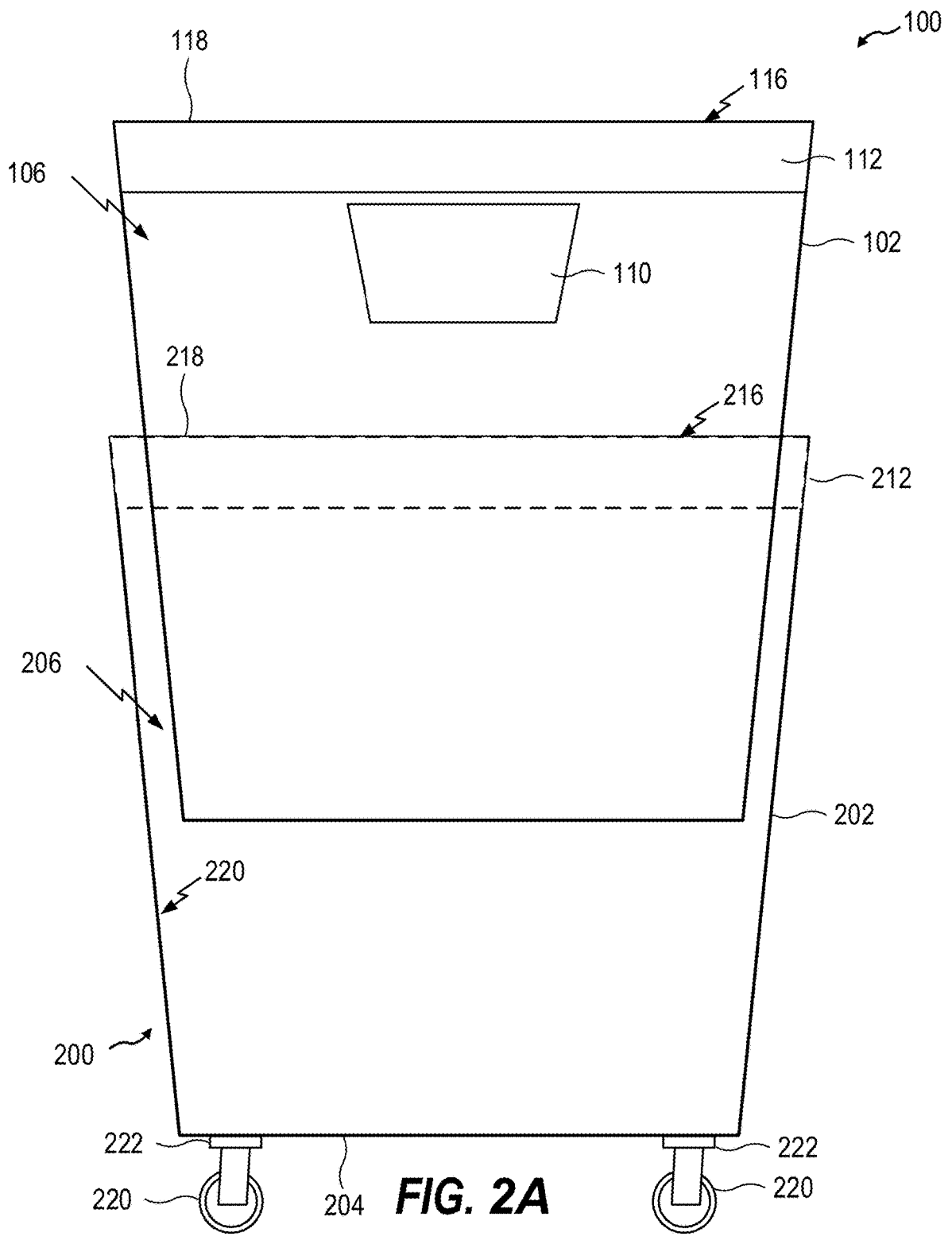
FIG. 2A schematically depicts a cross-sectional view of a first container partially nested in a second container, according to one or more embodiments shown and described herein.
Figure 2B:
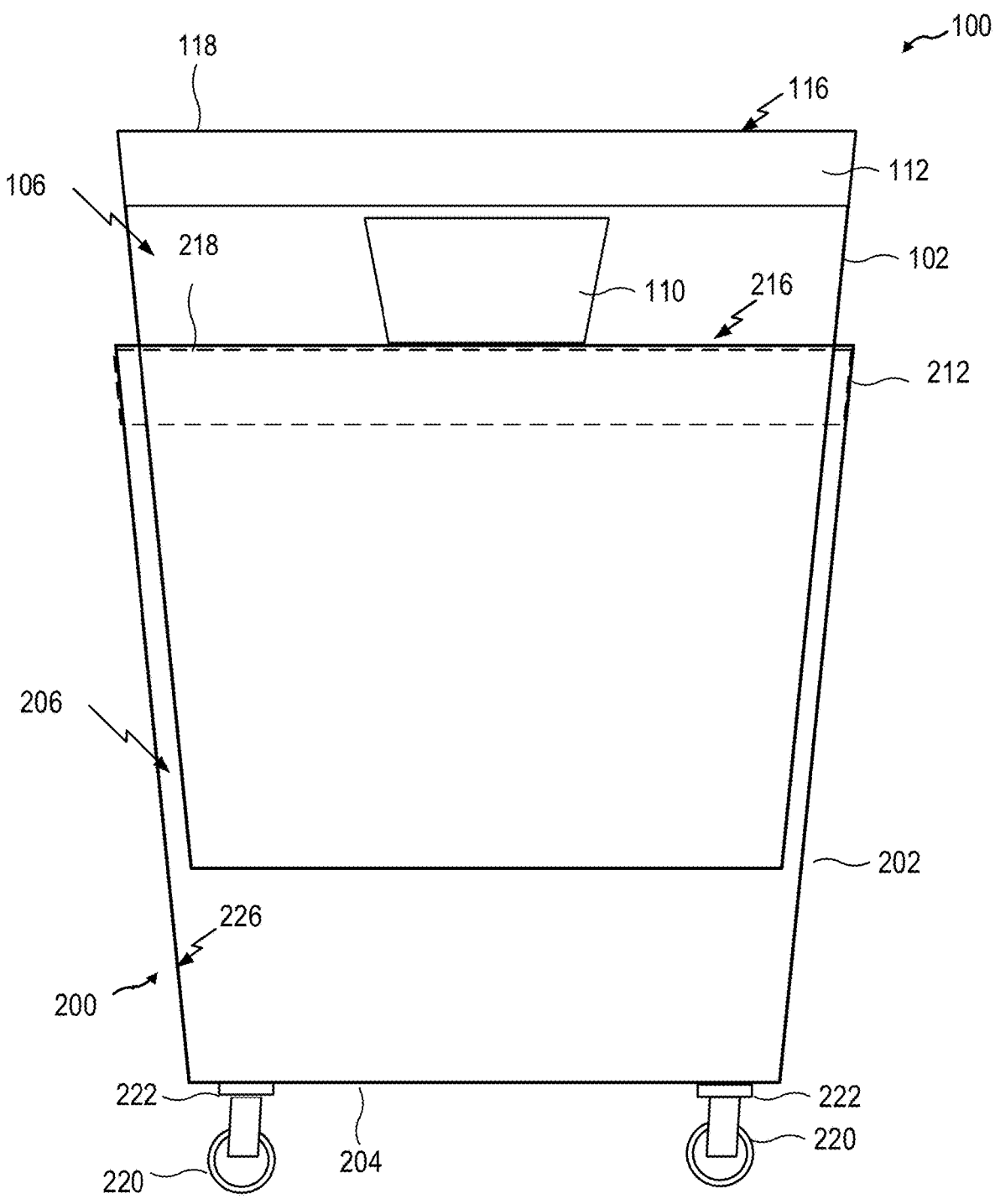
FIG. 2B schematically depicts a cross-sectional view of a first container nested in a second container, according to one or more embodiments shown and described herein.

In some embodiments, the first container 100 is nested, at least partially, within an interior volume of the second container, such as depicted in FIG. 2A. In some embodiments, a third container (not depicted) is nested, at least partially, within the interior volume 106. In some embodiments, tapering of the sidewall 102 may facilitate nesting of containers. However, the sidewall 102 of the first container 100 may contact a substantial portion of an interior of a sidewall of an interior volume of the second container, such as depicted in FIG. 2B. Air in the interior volume 106 of the first container may be evacuated when the third container is nested in the interior volume 106, creating suction between the first container 100 and the third container. As described herein, a spacer 110 may be coupled to the first container to facilitate removal of nested containers, for example, by preventing interlocking of the containers during nesting.

Figure 3:
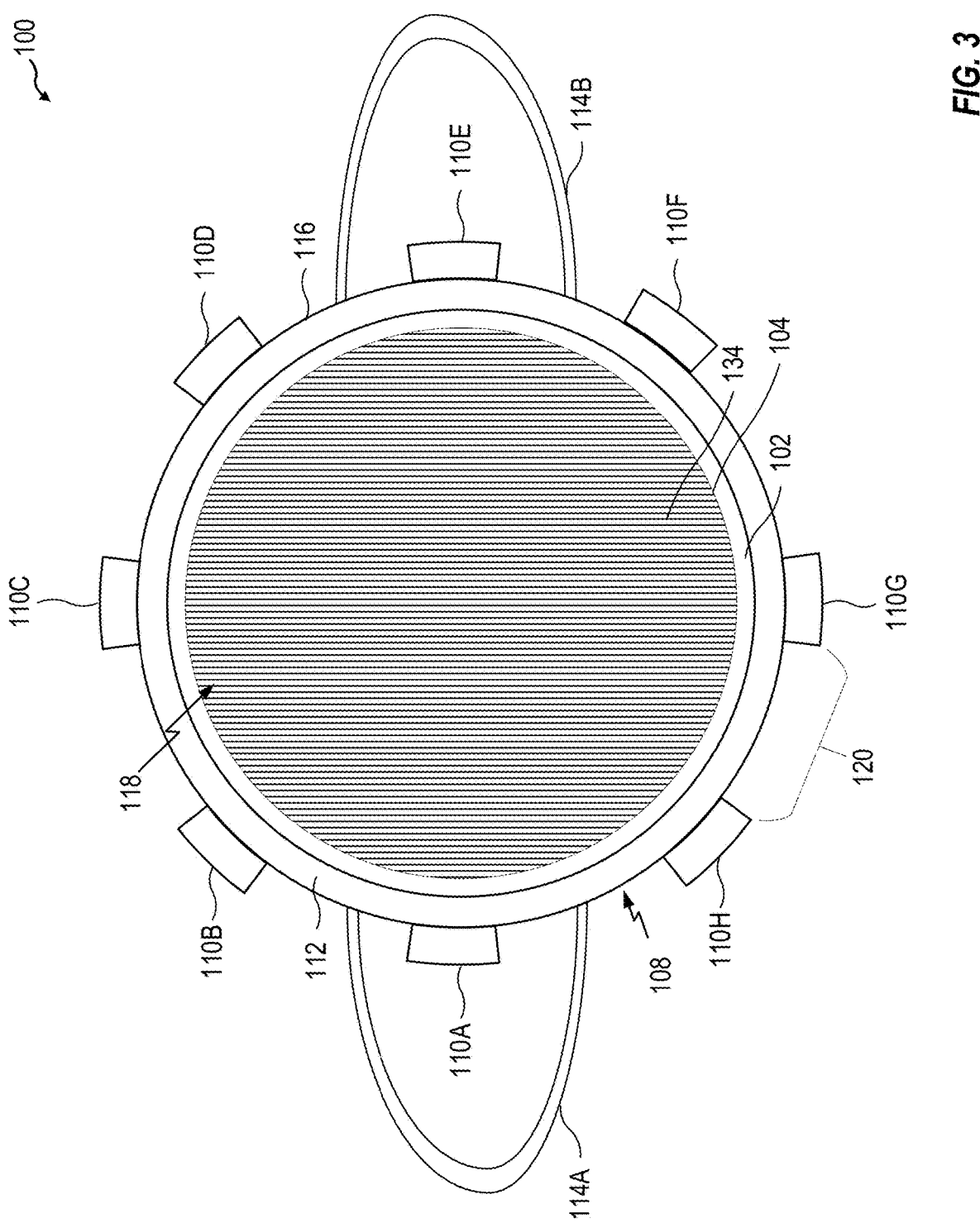
FIG. 3 schematically depicts a top view of a first container, according to one or more embodiments shown and described herein.

In some embodiments, a spacer 110 is disposed on an exterior surface 108 of the sidewall 102. The spacer 110 may be shaped to match a contour of the exterior surface 108 of the sidewall 102. In some embodiments, the spacer 110 may be disposed adjacent to the edge 116 of the sidewall 102. In some embodiments, the spacer 110 may be disposed below a lip 112 on the edge 116 of the sidewall 102. In some embodiments, the spacer 110 may be disposed below a bottom-most lip of a plurality of lips on the sidewall 102. As used herein, the bottom-most lip refers to the lip that is positioned nearest the base 104. In some embodiments, the spacer 110 may be disposed adjacent to the base 104 of the first container 100. In some embodiments, a plurality of spacers may be disposed on an exterior surface 108 of the sidewall 102, as depicted in FIG. 3.

The spacer 110 may be coupled to the exterior surface 108, for example, adhered, fastened, or otherwise fixedly attached to the sidewall 102. In some embodiments, adhesive may be applied to the spacer 110, the exterior surface 108 of the sidewall 102, or both, to couple the spacer 110 to the exterior surface 108. In some embodiments, the adhesive is a thermosetting adhesive or an ultraviolet-curable (UV-curable) adhesive. The adhesive may be cured to bond the spacer 110 to the sidewall 102. The adhesive may be cured at room temperature to allow the adhesive to set. In some embodiments, the curing process may be accelerated by applying external energy, such as applying heat, ultraviolet light, or both. Any external energy to accelerate the curing process is contemplated and possible.

In some examples, the spacer 110 may be integrated with the exterior surface 108, for example, molded from the sidewall 102 or molded thereon the sidewall 102. The spacer 110 extends proximally away from the sidewall 102.

The spacer 110 may be formed of a thermally sensitive material, for example a thermoplastic material or a ductile material. Exemplary thermoplastic materials include polyvinyl chloride, polypropylene, polyethylene, acrylonitrile butadiene styrene, polycarbonate, polystyrene, polyamide, polyurethane, polyethylene terephthalate, combinations thereof, and the like, though any suitable thermoplastic material is contemplated and possible. Exemplary ductile materials include metals, such as copper, aluminum, gold, silver, steel, combinations thereof, and the like.

In some embodiments, the spacer 110 is thermoformed from the thermally sensitive material. For example, the pliable material may be heated until the thermally sensitive material reaches a pliable state. It will be appreciated that the temperature required for the thermally sensitive material to reach a pliable state is dependent upon the composition of the thermally sensitive material. The thermally sensitive material may be heated through contact heating, infrared heating, convection heating, radiant heating, high-frequency heating, or combinations thereof, although any suitable heating mechanism is contemplated and possible.

The heated pliable thermally sensitive material is generally shaped to form the spacer 110. In some embodiments, the heated pliable thermally sensitive material is conformed to match the shape of the contour of the exterior surface 108 of the sidewall 102. For example, the heated pliable material may be fitted to a mold shaped to match or correspond to the contour of the exterior surface 108 of the sidewall 102. In some embodiments, the heated pliable thermally sensitive material is fitted to the contour of the sidewall 102. Exemplary methods of shaping the heated pliable thermally sensitive material include vacuum forming, pressure forming, mechanical forming, combinations thereof, and the like.

The thermally sensitive material may be cooled to solidify or fix the shape of the spacer 110. For example, the thermally sensitive material may be cooled through air cooling, water cooling, contact cooling, one or more cooling baths, refrigerated cooling, or combinations thereof, although any cooling mechanism is contemplated and possible.

In some embodiments, a plurality of spacers may be formed, for example, through thermoforming a plurality of spacers and coupling the plurality of spacers to the sidewall 102. In some embodiments, a plurality of spacers may be formed from a single piece of thermally sensitive material and separated, for example, after heating of the thermally sensitive material, or after cooling of the heated thermally sensitive material. In embodiments, individual spacers are separated from a shaped single piece of thermally sensitive material by breaking the single piece at predetermined locations, such as scored regions.

In some embodiments, a handle 114 is coupled with the first container 100 for example, adhered, fastened, or otherwise fixedly attached to the first container. For example, in FIG. 1, the handle 114 disposed on the exterior surface 108. In some examples, the handle 114 is coupled to the edge 116 of the sidewall 102.

Referring now to FIG. 2, a cross-sectional view of the first container 100 nested within a second container 200 is schematically depicted. The second container 200 may be substantially similar to the first container 100, as described with respect to FIG. 1. For example, the second container 200 has a base 204 coupled with a sidewall 202 extending substantially upward and tapering outward from the base 204. The sidewall 202 terminates at an edge 216 of the second container 200 to define an opening 218 through which an interior volume 206 of the second container 200 is accessed.

As described herein, tapering of a sidewall of a container facilitates nesting of multiple containers. For example, and as depicted, the first container 100 is disposed within the second container 200 through the opening 218. The tapering of the sidewall also facilitates contact between a substantial portion of a sidewall of the interior container of the nested containers (e.g., the sidewall 102 of the first container 100) and a sidewall of the exterior container of the nested containers (e.g., the sidewall 202 of the second container 200). Air contained in the interior volume (e.g., the interior volume 206) is evacuated when the first container 100 is disposed in the second container 200. A suction force may be generated as air is evacuated and the sidewalls of the containers (e.g., the sidewall 102 and the sidewall 202) come into contact with one another. In some embodiments, a greater suction force may be generated as contact between sidewalls of the containers increases. In some embodiments, one or more external factors may induce a greater or lesser suction force, for example, temperature, storage time, location, etc. In some embodiments, one or more characteristics of a container (e.g., one or both of the first container 100 and the second container 200) may induce a greater or lesser suction force, for example, material of a container, contents of a container (e.g., contents disposed in the interior volume 206 of the second container 200), manufacture of a container (e.g., manufacture flaw, tolerance, material, etc.), condition of a container (e.g., moisture, residue, crack, strain, stress, or age, etc.), and the like.

When the first container 100 is inserted into the interior volume 206 of the second container 200, the spacer 110 may contact an interior surface 220 of the sidewall 202 of the second container 200, thereby reducing or eliminating contact between the sidewall 102 and the sidewall 202. In some embodiments, the spacer 110 may contact an edge 216 of the second container 200, thereby reducing or eliminating contact between the sidewall 102 and the sidewall 202. The spacer 110 facilitates air flow between the interior volume 206 and the environment in which the containers are nested, through opening 218. A suction force between the second container 200 and the first container 100 may therefore be reduced and facilitate a reduction in force required to remove the first container 100 from the second container 200. Moreover, the spacer 110 may prevent interlocking of the first container 100 and the second container 200.

In some embodiments, the spacer 110 may be disposed on the interior surface 220 within the interior volume 206 of the second container 200 and extend distally towards the interior of the second container 200 (not shown). When the first container 100 is inserted into the interior volume 206 of the second container the spacer may nevertheless contact the exterior surface 108 of the sidewall 102 of the first container 100 as well as the interior surface 220 of the second container 200, thereby preventing interlocking of the first container 100 and the second container 200.

Still referring to FIG. 2, in some embodiments, the second container 200 includes a plurality of wheels 220 to aid in mobility of the nest of containers. The plurality of wheels includes any suitable number for the containers being nested, including 2, 3, 4, 5, 6, etc. In some embodiments, the wheels 220 are coupled to the base 204 of the second container 200. Exemplary coupling mechanisms include mechanical fastening, adhesives, thermal bonding, interlocking mechanisms, fusion bonding, and the like, though any suitable mechanism is contemplated and possible.

In some embodiments, the wheels 220 are coupled to a wheel base 222. In some embodiments, each wheel of the plurality of wheels 220 are coupled to an independent wheel base 222. In other embodiments, the plurality of wheels 220 are coupled to a single wheel base 222. Optionally, the wheel base 222 is coupled to the base 204 of the second container 200. In some embodiments, the wheel base 222 is sized and shaped to match the base 204. Any suitable mechanism to couple the wheels 220 to the wheel base 222 is contemplated and possible. For example and without being bound by theory, the wheel base 222 may be adhered, fastened, thermally bonded, welded, etc. It will be appreciated that the wheel base 222 allows for the wheels 220 to be coupled to the second container 200 without damaging the integrity of the container.

FIG. 3 schematically depicts a top view of a first container 100 with an interior surface 134 of the base 104 visible through the opening 118. The edge 116 is visible as lip 112.

In some embodiments, one or more handles may be disposed on the sidewall 102, here, two handles 114A and 114B are depicted. The handles 114A and the handle 114B may assist in separating the first container from the second container when in a nested conformation.

In an embodiment according to FIG. 3, a plurality of spacers 110A-110H (collectively, spacers 110) may be disposed on the first container 100, for example, on the exterior surface 108 of sidewall 102. In some embodiments, additional or fewer spacers 110 may be disposed on the first container 100. In some embodiments, the spacers 110 may be disposed incrementally on the first container 100. In some embodiments, the spacers 110 may be disposed on the first container 100 at regular intervals. For example, and without limitation, the spacers 110 may be spaced at 15 degree intervals, 30 degree intervals, 45 degree intervals, 60 degree intervals, or 90 degree intervals. In some embodiments, the spacers 110 may disposed at uneven intervals. In some embodiments, a space between each spacer may define a gap, depicted here between spacer 110G and spacer 110H as gap 120. In some embodiments, a plurality of gaps may be defined by the plurality of spacers.

When the first container 100 is inserted into an interior volume of a second container (e.g., the interior volume 206 of the second container 200 in FIGS. 2A-2B), each of the plurality of spacers 110 contacts both the exterior surface 108 of the first container 100 and the interior surface 220 of the second container 200. Each of the plurality of spacers 110 reduce or eliminate direct contact between the first container 100 and the second container 200. The gap 120 may be further defined between the exterior surface 108 of the first container and the interior surface 208 of the second container. The gap 120 formed by the plurality of spacers 110 further facilitates air flow between the interior volume 206 of the second container and the environment to reduce suction force between the first container 100 and the second container 200. Thereby, interlocking of the first container 100 and the second container 200 may be further reduced.

FIGS. 4A-4B schematically depict various example spacers 410A-410D (collectively spacers 410). As described herein, the spacers 410 may prevent interlocking of nestable containers. In particular, the spacers 410 may be coupled to the exterior surface of a nestable container such that when a first container is inserted into an interior volume of a second container, one or more of the spacers 410 contact the top surface of a sidewall of the second container thereby allowing airflow between the first container and the second container and preventing the first container and the second container from interlocking.

The spacers 410 may be thermoformed from a pliable material. In some examples, the pliable material may be a thermoplastic material or a ductile material. Thermoforming the spacers 410 may comprise heating the pliable material to reach a pliable state. As the pliable material is heated, the material may become increasingly malleable, enabling conformation and manipulation of the pliable material. The pliable material may be heated through contact heating, infrared heating, convection heating, radiant heating, high-frequency heating, or a combination of heating methods. Once the pliable material is sufficiently heated, the pliable material may be conformed into the spacers 410, for example, shaping the pliable material to match a contour of the exterior surface of the sidewall of the container. The pliable material may be shaped based on fitting the pliable material to the contour of the sidewall, for example, aligning the pliable material to the contour of the sidewall. The pliable material may be shaped based on fitting the pliable material to a mold, for example, where the mold matches the contour of the sidewall.

Once the thermally sensitive material is shaped, the thermally sensitive material may be cooled to solidify or fix the shape of the spacer. For example, the thermally sensitive material may be cooled through air cooling, water cooling, contact cooling, cooling baths, refrigerated cooling, or a combination of cooling methods. The spacer may then be coupled to the exterior of the container.

In some embodiments, a single spacer may be thermoformed from the thermally sensitive material. In some embodiments, a plurality of spacers may be thermoformed from the thermally sensitive material. For example, after the thermally sensitive material is heated, one or more portions of the thermally sensitive material may be separated to form a plurality of spacers. In another example, after the shaped thermally sensitive material is cooled, one or more portions of the thermally sensitive material may be separated to form a plurality of spacers.

In FIG. 4A, the spacer 410A is depicted from a side view. The spacer 410A includes a right side 442, a left side 446, a bottom side 444, and a top side 448. An exterior face 450 is viewable. The spacer 410A may be coupled to the container such that the exterior face 450 is substantially parallel to the sidewall of the container (e.g., parallel to the sidewall 102 in FIG. 1).

In some embodiments, the spacer 410A is disposed on the exterior surface of the container with the top side 448 positioned below a top edge of the container. In some embodiments, the container comprises one or more lips and the spacer 410A is disposed below the bottom-most lip of the one or more lips. In some embodiments, the bottom side 444 of the spacer is positioned closest to the top edge of the container. In the depicted example, the spacer 410A tapers from the top side 448 inward towards the bottom side 444, whereby the bottom side 444 is narrower than the top side 448. In other embodiments, the right side 442 and the left side 446 are substantially perpendicular such that the top side 448 and the bottom side 444 are substantially the same length.

In some embodiments, the top side 448 may have a length of from about 0.5 inches to about 5 inches, including 1.0, 1.5, 2.0, 2.5, 3.0, 3.5, 4.0, and 4.5, or any range having endpoints defined by any two of the aforementioned values. In some embodiments, the bottom side 444 may have a length of from about 0.5 inches to about 5 inches, including 1.0, 1.5, 2.0, 2.5, 3.0, 3.5, 4.0, and 4.5, or any range having endpoints defined by any two of the aforementioned values. In some embodiments, the right side 442 may have a length of from about 0.5 inches to about 5 inches, including 1.0, 1.5, 2.0, 2.5, 3.0, 3.5, 4.0, and 4.5, or any range having endpoints defined by any two of the aforementioned values. In some embodiments, the left side 446 may have a length of from about 0.5 inches to about 5 inches, including 1.0, 1.5, 2.0, 2.5, 3.0, 3.5, 4.0, and 4.5, or any range having endpoints defined by any two of the aforementioned values.

In FIG. 4B, the spacer 410B is depicted from a top view. In this example, the top side 448 is viewable as well as the right side 442 and the left side 446. The exterior face 450 is opposite an interior face 452. The exterior face 450 and the interior face 452 may be substantially concentric to the sidewall of the container. Moreover, the exterior face 450, the interior face 452, and the sidewall may be coaxial to a center axis of the container. The spacer 410B is shaped to substantially align with the contour of the sidewall.

In some embodiments, the spacer 410B may be fitted to match the contour of the sidewall of the container through alignment of the spacer 410B with the sidewall. In some embodiments, the spacer 410B may be fitted to match the contour of the sidewall of the container through a mold configured to match the contour of the sidewall.

The interior face 452 is configured to couple to the exterior surface of the sidewall of the container. For example, the interior face 452 may be adhered, fastened, or otherwise fixedly attached to the exterior surface of the sidewall. In some embodiments, an adhesive is applied to the interior face 452 to couple the spacer 410B to the exterior surface. In some embodiments, an adhesive is applied to the exterior surface in alignment with the interior face 452 of the spacer 410B to couple the spacer 410B and the container. In some embodiments, the adhesive is a thermosetting adhesive or an ultraviolet-curable adhesive. The adhesive may be cured to bond the spacer 410B and the container. The adhesive may be cured, for example, through heating, cooling, drying, or applying an ultraviolet light. In some embodiments, the adhesive may be cured at room temperature.

In FIG. 4C, the spacer 410C is depicted from a first side view. In this example, the left side 446 is viewable as well as the top side 448 and the bottom side 444. The exterior face 450 faces outward (e.g., towards a second container) and the interior face 452 faces inward and may be coupled to the exterior surface of a first container. In the depicted example, the spacer 410C has a substantially equal thickness of an upper end closer to the top side 448 and a lower end closer to the bottom side 444 and along the length of the spacer. In some embodiments, the spacer 410C may taper towards the bottom side 444, whereby the upper end is thicker and the lower end is thinner. In some embodiments, the spacer 410C may taper towards the top side 448, whereby the upper end is thinner and the lower end is thicker.

In FIG. 4D, the spacer 410D is depicted from a second side view. In this example, the exterior face 450 of the spacer 410D is viewable as the length of the spacer 410D contours to match a contour of the sidewall. For example, an arc of the spacer 410D aligns with an arc of the sidewall. In some embodiments, where a plurality of spacers 410 may be coupled to the container, each of the spacers 410 may contour circumferentially along the sidewall of the container.

FIG. 5 depicts an example of a method 500 of preventing the interlocking of nestable containers, such as first container 100 and second container 200, described with respect to FIGS. 1-4D. In some embodiments, the first container and the second container are buckets.

Initially, method 50 begins at step 502 with providing a first container, such as the first container 100, having a sidewall and a base, such as the sidewall 102 and the base 104. The sidewall extends substantially upward from the base to define an interior volume, such as the interior volume 106.

Method 500 proceeds to step 504 with thermoforming a spacer, such as the spacer 110, from a pliable material. In some embodiments, the thermally sensitive material is a thermoplastic material. In some embodiments, the thermally sensitive material is a ductile material.

Thermoforming the spacer from the thermally sensitive material comprises heating the thermally sensitive material to reach a pliable state. In some embodiments, heating the thermally sensitive material comprises contact heating, infrared heating, convection heating, radiant heating, high-frequency heating, or combinations thereof.

Thermoforming the spacer further comprises conforming the heated pliable material to form the spacer. The spacer is shaped to match a contour of an exterior surface of the sidewall. In some embodiments, conforming the heated pliable material to form the spacer comprises fitting the pliable material to the contour of the sidewall. In some embodiments, conforming the heated pliable material to form the spacer comprises fitting the pliable material to a mold, wherein the mold is shaped to match the contour of the exterior surface of the sidewall.

Thermoforming the spacer further comprises cooling the spacer to solidify the shape. In some embodiments, cooling the spacer comprises air cooling, water cooling, contact cooling, one or more cooling baths, refrigerated cooling, or combinations thereof.

Method 500 then proceeds to step 506 with coupling the spacer to the exterior surface of the sidewall, for example, the exterior surface 108 of the sidewall 102. When the first container is inserted into an interior volume of a second container, such as the interior volume 206 of the second container 200, the spacer contacts a top surface of a sidewall of the second container, for example, the spacer 110 is in contact with the interior surface 208 of the sidewall 202 of the second container 200. This contact allows airflow between the first container and the second container, thereby preventing the first and second containers from interlocking.

In some embodiments, coupling the spacer to the exterior surface of the sidewall comprises applying an adhesive to at least one of the spacer or the exterior surface of the sidewall. In some embodiments, the adhesive is a thermosetting adhesive or an ultraviolet-curable adhesive. In some embodiments, the method further comprises curing the adhesive to bond the spacer to the first container. In some embodiments, curing the adhesive comprises allowing the adhesive to set a room temperature, or applying heat or ultraviolet light to accelerate the curing.

In some embodiments, the first container comprises a plurality of lips and the spacer is coupled to the exterior surface below a bottom-most lip of the plurality of lips.

In some embodiments, a plurality of spacers are thermoformed and coupled to the sidewall of the first container. In some embodiments, the plurality of spacers are formed by separating a single piece of pliable material. In some embodiments, the plurality of spacers are separated after cooling the thermally sensitive material. In some embodiments, the plurality of spacers are separated after heating the thermally sensitive material.

Note that method 500 is just one example, and other methods including fewer, additional, or alternative steps, consistent with this disclosure, are possible.

EXAMPLE CLAUSES

Implementation examples are described in the following numbered clauses:

Clause 1: A method of preventing interlocking of nestable containers, the method comprising: providing a first container having a sidewall and a base, wherein the sidewall extends substantially upward from the base to define an interior volume; thermoforming a spacer from a thermally sensitive material, wherein thermoforming comprises: heating the thermally sensitive material until the thermally sensitive material reaches a pliable state; conforming the heated pliable thermally sensitive material to form a spacer, wherein the spacer has a shape corresponding to a contour of an exterior surface of the sidewall; and cooling the spacer to solidify the shape; and coupling the spacer to the exterior surface of the sidewall, such that when the first container is inserted into an interior volume of a second container, the spacer contacts a top surface of a sidewall of the second container, thereby allowing airflow between the first container and second container and preventing the first container and the second container from interlocking.

Clause 2: The method of clause 1, wherein the thermally sensitive material is a thermoplastic material.

Clause 3: The method of clause 1, wherein the thermally sensitive material is a ductile material.

Clause 4: The method of any one of clauses 1-3, wherein coupling the spacer to the exterior surface of the sidewall comprises applying an adhesive to at least one of the spacer or the exterior surface of the sidewall.

Clause 5: The method of clause 4, wherein the adhesive is a thermosetting adhesive or a UV-curable adhesive.

Clause 6: The method of clause 4, further comprising curing the adhesive to bond the spacer to the first container.

Clause 7: The method of clause 6, wherein curing the adhesive comprises allowing the adhesive to set at room temperature or applying heat or ultraviolet light to accelerate the curing.

Clause 8: The method of any one of clauses 1-7, wherein the first container and the second container are buckets.

Clause 9: The method of any one of clauses 1-8, wherein the first container comprises a plurality of lips and wherein the spacer is coupled to the exterior surface below a bottom-most lip of the plurality of lips.

Clause 10: The method of any one of clauses 1-9, further comprising thermoforming a plurality of spacers and coupling the plurality of spacers to the sidewall of the first container.

Clause 11: The method of clause 10, wherein the plurality of spacers are formed by separating a single piece of thermally sensitive material.

Clause 12: The method of clause 11, wherein the plurality of spacers are separated after cooling the single piece of thermally sensitive material.

Clause 13: The method of clause 11, wherein the plurality of spacers are separated after heating the thermally sensitive material.

Clause 14: The method of any one of clauses 1-13, wherein cooling the spacer comprises air cooling, water cooling, contact cooling, cooling baths, refrigerated cooling, or combinations thereof.

Clause 15: The method of any one of clauses 1-14, wherein conforming the heated thermally sensitive material to form the spacer comprises fitting the pliable material to a mold, wherein the mold is shaped to match the contour of the exterior surface of the sidewall.

Clause 16: The method of any one of clauses 1-14, wherein conforming the heated thermally sensitive material to form the spacer comprises fitting the thermally sensitive material to the contour of the sidewall.

Clause 17: The method of any one of clauses 1-15, wherein heating the thermally sensitive material comprises contact heating, infrared heating, convection heating, radiant heating, high-frequency heating, or combinations thereof.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Reference to an element in the singular is not intended to mean only one unless specifically so stated, but rather "one or more." For example, reference to an element (e.g., "a processor," "a memory," etc.), unless otherwise specifically stated, should be understood to refer to one or more elements (e.g., "one or more processors," "one or more memories," etc.). The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the terms "substantially" and "about" may be utilized to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of preventing interlocking of nestable containers, the method comprising:
    providing a first container having a sidewall and a base, wherein the sidewall extends substantially upward from the base to define an interior volume;
    thermoforming a spacer from a thermally sensitive material, wherein thermoforming comprises:
        heating the thermally sensitive material until the thermally sensitive material reaches a pliable state;
        conforming the heated thermally sensitive material to form a spacer, wherein the spacer has a shape corresponding to a contour of an exterior surface of the sidewall; and
        cooling the spacer to solidify the shape; and
    coupling the spacer to the exterior surface of the sidewall by applying an adhesive to at least one of the space or the exterior surface of the sidewall, wherein the adhesive is a thermosetting adhesive or a UV-curable adhesive, such that when the first container is inserted into an interior volume of a second container, the spacer contacts a top surface of a sidewall of the second container, thereby allowing airflow between the first container and second container and preventing the first container and the second container from interlocking.

2. The method of claim 1, wherein the thermally sensitive material is a thermoplastic material.

3. The method of claim 1, wherein the thermally sensitive material is a ductile material.

4. The method of claim 1, further comprising curing the adhesive to bond the spacer to the first container.

5. The method of claim 4, wherein curing the adhesive comprises allowing the adhesive to set at room temperature or applying heat or ultraviolet light to accelerate the curing.

6. The method of claim 1, wherein the first container and the second container are buckets.

7. The method of claim 1, wherein the first container comprises a plurality of lips and wherein the spacer is coupled to the exterior surface below a bottom-most lip of the plurality of lips.

8. The method of claim 1, further comprising thermoforming a plurality of spacers and coupling the plurality of spacers to the sidewall of the first container.

9. The method of claim 8, wherein the plurality of spacers are formed by separating a single piece of shaped thermally sensitive material.

10. The method of claim 9, wherein the plurality of spacers are separated after cooling the single piece of thermally sensitive material.

11. The method of claim 9, wherein the plurality of spacers are separated after heating the single piece of thermally sensitive material.

12. The method of claim 1, wherein cooling the spacer comprises air cooling, water cooling, contact cooling, cooling baths, refrigerated cooling, or combinations thereof.

13. The method of claim 1, wherein conforming the heated pliable thermally sensitive material to form the spacer comprises fitting the heated thermally sensitive material to a mold, wherein the mold is shaped to correspond to the contour of the exterior surface of the sidewall.

14. The method of claim 1, wherein conforming the heated thermally sensitive material to form the spacer comprises fitting the heated thermally sensitive material to the contour of the sidewall.

15. The method of claim 1, wherein heating the thermally sensitive material comprises contact heating, infrared heating, convection heating, radiant heating, high-frequency heating, or combinations thereof.

16. A method of preventing interlocking of nestable containers, the method comprising:
    providing a first container having a sidewall and a base, wherein the sidewall extends substantially upward from the base to define an interior volume;
    thermoforming a spacer from a thermally sensitive material, wherein thermoforming comprises:
        heating the thermally sensitive material until the thermally sensitive material reaches a pliable state;
        conforming the heated thermally sensitive material to form a spacer, wherein the spacer has a shape corresponding to a contour of an exterior surface of the sidewall; and
    cooling the spacer to solidify the shape; and
    coupling the spacer to the exterior surface of the sidewall by applying a thermosetting adhesive to at least one of the space or the exterior surface of the sidewall, such that when the first container is inserted into an interior volume of a second container, the spacer contacts a top surface of a sidewall of the second container, thereby allowing airflow between the first container and second container and preventing the first container and the second container from interlocking.

17. The method of claim 16, further comprising curing the thermosetting adhesive to bond the spacer to the first container.

18. The method of claim 17, wherein curing the thermosetting adhesive comprises allowing the thermosetting adhesive to set at room temperature or applying heat or ultraviolet light to accelerate the curing.

19. A method of preventing interlocking of nestable containers, the method comprising:

proviing a first container having a sidewall and a base, wherein the sidewall extends substantially upward from the base to define an interior volume;

thermoforming a spacer from a thermally sensitive material, wherein thermoforming comprises:

heating the thermally sensitive material until the thermally sensitive material reaches a pliable state;

conforming the heated thermally sensitive material to form a spacer, wherein the spacer has a shape corresponding to a contour of an exterior surface of the sidewall; and cooling the spacer to solidify the shape; and coupling the spacer to the exterior surface of the sidewall by applying a UV-curable adhesive to at least one of the space or the exterior surface of the sidewall, such that when the first container is inserted into an interior volume of a second container, the spacer contacts a top surface of a sidewall of the second container, thereby allowing airflow between the first container and second container and preventing the first container and the second container from interlocking.

20. The method of claim 19, further comprising curing the UV-curable adhesive to bond the spacer to the first container by allowing the UV-curable adhesive to set at room temperature or applying heat or ultraviolet light to accelerate the curing.

* * * * *